United States Patent [19]
von Bonin

[11] 4,338,412
[45] Jul. 6, 1982

[54] INTUMESCENT COMPOSITIONS OBTAINED BY REACTING POLYISOCYANATES, PHOSPHORUS-CONTAINING SUBSTANCES AND AROMATIC HYDROXY CARBOXYLIC ACIDS ON SALTS

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 276,559

[22] Filed: Jun. 23, 1981

[30] Foreign Application Priority Data

Jul. 4, 1980 [DE] Fed. Rep. of Germany ....... 3025309

[51] Int. Cl.$^3$ .............................................. C08G 18/14
[52] U.S. Cl. .................................... 521/157; 521/165; 528/71; 528/72
[58] Field of Search .................. 521/157, 165; 528/71, 528/72

[56] References Cited

U.S. PATENT DOCUMENTS 2,907,746 10/1959 Greenlee ............................. 521/157
3,684,754 8/1972 Barie, Jr. et al. ..................... 260/2.5
4,258,141 3/1981 Janre et al. ........................... 521/114

FOREIGN PATENT DOCUMENTS 1143022 7/1963 Fed. Rep. of Germany .

Primary Examiner—Maurice J. Welsh
Attorney, Agent, or Firm—Gene Harsh; Joseph C. Gil

[57] ABSTRACT

The present invention is directed to intumescent compositions, which may be foamed, obtained by reacting:
(1) polyisocyanates,
(2) phosphorus-containing condensation products having at least one hydroxyl group and obtained by condensing (i) primary or secondary aliphatic, cycloaliphatic, aromatic, araliphatic or heterocyclic monoamines and/or polyamines, which mono- and polyamines may contain OH groups, (ii) carbonyl compounds, and (iii) dialkyl phosphites,
(3) aromatic hydroxy carboxylic acids or salts thereof, and
(4) optionally, water and/or additional organic compounds containing isocyanate-reactive hydrogen atoms.

6 Claims, No Drawings

INTUMESCENT COMPOSITIONS OBTAINED BY REACTING POLYISOCYANATES, PHOSPHORUS-CONTAINING SUBSTANCES AND AROMATIC HYDROXY CARBOXYLIC ACIDS ON SALTS

BACKGROUND OF THE INVENTION

The present invention relates to intumescent compositions based on foamed or unfoamed polyurethanes and containing aromatic hydroxy carboxylic acids as part of the formulation.

Intumescent compositions are generally understood to be compositions which foam under the effect of fire and heat and form an insulating and fire-resistant foam which protects the zones situated behind the foam against fire. Such intumescent compositions are generally known in the form of lacquers, coatings and mortars or cements.

In order to be particularly useful, an intumescent composition must combine various properties. For example, it must foam above 100° C. and below 300° C., and preferably between 200° and 300° C. Secondly, it must foam both in the event of direct contact with the flame (i.e., in the event of rapid heating) and also when the foaming temperature is reached very slowly (e.g., over a period of as long as one hour, such as generally is the case for a smouldering fire). The intumescent composition heated very slowly to its foaming temperature should still be capable of foaming when it comes into contact with a flame. Furthermore, in the event of slow or rapid heating, little or no shrinkage should occur, and, such shrinkage as may occur, should be overcompensated for above the foaming temperature. Intumescent compositions whose effectiveness is not impaired by the presence of water would also be particularly advantageous. Additionally, it would also be as advantageous if the intumescent composition showed very good thermal insulation, even in the absence of thermal stressing. Finally, intumescent compositions must be free from halogen (risk of corrosion).

Although conventional intumescent compositions satisfy some of the requirements mentioned above, there is no known intumescent composition which satisfies all these requirements.

Accordingly, there is a need for improved intumescent compositions of the type in question. The present invention provides such intumescent compositions.

DESCRIPTION OF THE INVENTION

Accordingly, the present invention relates to intumescent compositions, which may be foamed, and which are obtained by reacting (1) polyisocyanates, (2) phosphorus-containing condensation products having at least one, preferably at least two hydroxyl groups obtainable by condensing (i) primary or secondary aliphatic, cycloaliphatic, aromatic, araliphatic or heterocyclic monoamines and/or polyamines, which mono- or polyamines optionally may contain OH groups; (ii) carbonyl compounds; and (iii) dialkyl phosphites, optionally followed by alkoxylation, (3) aromatic hydroxy carboxylic acids or salts thereof, and (4) optionally, water and/or additional organic compounds containing isocyanate-reactive hydrogen atoms.

Preferred intumescent compositions are obtained by reacting from 50 to 180 parts, by weight, of a polyisocyanate with 100 parts, by weight, of a mixture consisting of (a) from 25 to 80%, by weight, of phosphorus-containing condensation products having at least two hydroxyl groups; (b) from 10 to 65%, by weight, of hydroxyl carboxylic acids or salts thereof; and (c) from 0 to 8.5%, by weight, of water and/or from 0 to 50%, by weight, of additional organic compounds containing isocyanate-reactive hydrogen atoms.

The production of polyurethanes from polyisocyanates and the phosphorus-containing condensation products having at least two hydroxyl groups mentioned above is known and is described in German Patent 1,143,022 which is particularly directed to flame-resistant foams. Following removal of a flame directed onto such polyurethanes, any burning caused by the flame stops. When such foams were tested for suitability as intumescent compositions, it was found that, although they were satisfactory with regard to flame resistance, they did not show the desirable properties noted above upon gradual heating to temperatures of from 200° to 300° C. If such foams are heated to 260° C. over a period of 60 minutes, they either undergo hardly any change in volume or, more usually, shrink to a considerable extent. The samples preheated in this way cannot subsequently be foamed beyond the original volume, even under the effect of a relatively high temperature. Such compositions are thus not suitable for use as intumescent materials.

Extensive efforts to combine the flame resistance of these known polyurethanes with useful intumescent behavior resulted in the unexpected discovery that the use of aromatic hydroxy carboxylic acids or salts thereof in accordance with the present invention produces the desired result.

Surprisingly, not only solid polyurethanes produced in this way, but also foams having relatively low densities, for example from 40 to 400 kg/m$^3$, foam vigorously both during the described heating test and upon contact with a flame. It is also surprising that the polyurethane products preheated, for example, to 260° C. are capable of foaming again upon subsequent exposure to elevated temperatures such as that caused, for example, by a flame.

It is also surprising that the addition of aromatic hydroxy carboxylic acids and/or salts thereof does not interfere with the production of a foam, but instead even enables the catalysts, foam stabilizers and emulsifiers normally used for polyurethane foams to be dispensed with, in many cases. In addition, it has been found that the effectiveness as intumescent compositions of the polyurethanes of the present invention (even where they are present in the form of large-surface foams) is not adversely affected by storage in water.

Furthermore, the present invention allows for the use of intumescent materials in the form of foams. Thus, the intumescent material itself is capable of acting as a thermal insulating material, even in the absence of thermal stressing. Additionally, since the materials can be used in the form of foams, numerous designs of construction are possible.

Furthermore, elastic, flexible or rigid foamed or unfoamed intumescent compositions, free from halogen, are obtainable in accordance with the present invention. Thus, in the event of a fire, there is no danger of hydrogen halide corrosion caused by the intumescent composition.

The products obtainable in accordance with the present invention, and in particular rigid foams, may be thermoplastically processed at temperatures below the decomposition point thereof, i.e., at temperatures of from 180° to 200° C., without losing the intumescent effect thereof. Due to this surprising behavior, it is possible, for example, to process the products into moldings or to transform prefabricated foams into new moldings.

The new intumescent materials may be produced either continuously or in batches. Production may be carried out in situ by mixing the components or premixed component mixtures and pouring the reaction mixture either by machine or by hand into cavities to be closed or into heated or unheated molds in which they subsequently foam and/or harden. If suitable equipment is used, the mixture may be sprayed, coated or cast onto the substrates to be protected. It is also possible initially to produce semifinished products (e.g., foams or coatings) and then to subject these semifinished products to further processing by whatever method is considered necessary, for example, cutting, hot forming, granulation, grinding or mixing.

By combining the reaction mixtures with foamed or solid inorganic or organic additives, such as polystyrene foam, polyurethane foam, gravel, expanded clay, urea or phenolic resin foams, foamed glass, wood, mineral wool, pumice and the like, it is even possible to obtain concrete-like materials having particularly desirable intumescent properties. The intumescent compositions according to the present invention may also be used for the production of moldings reinforced with fibers or wires or with woven or nonwoven fabrics of organic or inorganic materials or as a constituent of multilayer or sandwich materials.

Suitable isocyanates useful according to the present invention include aliphatic, cycloaliphatic, araliphatic, aromatic and heterocyclic polyisocyanates of the type known in the art and described, for example, by W. Siefken in Justus Liebigs Annalen der Chemie, 562, pages 75 to 136. Particularly useful are isocyanates corresponding to the following general formula:

$$Q(NCO)_n$$

wherein n=2-4 and preferably 2, and

Q represents an aliphatic hydrocarbon radical containing from 2 to 18, preferably from 6 to 10, carbon atoms, a cycloaliphatic hydrocarbon radical containing from 4 to 15, preferably from 5 to 10, carbon atoms, an aromatic hydrocarbon radical containing from 6 to 15, preferably from 6 to 13, carbon atoms or an araliphatic hydrocarbon radical containing from 8 to 15, preferably from 8 to 13, carbon atoms. Specific isocyanates useful herein include, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanates and mixtures of such isomers; 1-isocyanato-3,3,5-trimethyl-5-isocyanatomethyl cyclohexane (German Auslegeschrift No. 1,202,785 and U.S. Pat. No. 3,401,190); 2,4- and 2,6-hexahydrotolylene diisocyanates and mixtures of such isomers; hexahydro-1,3- and/or -1,4-phenylene diisocyanates; perhydro-2,4'- and/or -4,4'-diphenylmethane diisocyanates; 1,3- and 1,4-phenylene diisocyanates; 2,4- and 2,6-tolylene diisocyanates and mixtures of such isomers; diphenylmethane-2,4'- and/or -4,4'-diisocyanates; naphthylene-1,5-diisocyanate; and the like.

According to the present invention, it is also possible to use triphenylmethane-4,4',4''-triisocyanate; polyphenyl polymethylene polyisocyanates, e.g., those of the type obtained by condensing aniline with formaldehyde, followed by phosgenation, and described, for example, in British Pat. Nos. 874,430 and 848,671; m- and p-isocyanatophenyl sulphonyl isocyanates as described in U.S. Pat. No. 3,454,606; perchlorinated aryl polyisocyanates of the type described, for example, in U.S. Pat. No. 3,277,138; polyisocyanates containing carbodiimide groups of the type described in U.S. Pat. No. 3,152,162 and in German Offenlegungsschriften Nos. 2,504,400; 2,537,685 and 2,552,350; norbornane diisocyanates as described in U.S. Pat. No. 3,492,330; polyisocyanates containing allophanate groups of the types described, for example, in British Pat. No. 994,890, Belgian Pat. No. 761,626 and Dutch patent application No. 7,102,524; polyisocyanates containing isocyanurate groups of the type described, for example, in U.S. Pat. No. 3,001,973, in German Pat. Nos. 1,022,789; 1,222,067 and 1,027,394, and German Offenlegungsschriften Nos. 1,929,034 and 2,004,048; polyisocyanates containing urethane groups of the type described, for example, in Belgian Pat. No. 752,261 or U.S. Pat. Nos. 3,394,164 and 3,664,457; polyisocyanates containing acylated urea groups as described in German Pat. No. 1,230,778; polyisocyanates containing biuret groups of the type described, for example, in U.S. Pat. Nos. 3,124,605 and 3,201,372 and British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, U.S. Pat. No. 3,567,763 and German Pat. No. 1,231,688; reaction products of the above-mentioned isocyanates with acetals as described in German Pat. No. 1,072,385; and polyisocyanates containing polymeric fatty acid esters as described in U.S. Pat. No. 3,455,883. It is also possible to use the isocyanate group-containing distillation residues obtained in the commercial production of isocyanates, optionally in solution in one or more of the above-mentioned polyisocyanates. It is also possible to use mixtures of any of the above-mentioned polyisocyanates.

In general, it is particularly preferred to use commercially available polyisocyanates, for example 2,4- and 2,6-tolylene diisocyanates, and mixtures of such isomers ("TDI"); polyphenyl polymethylene polyisocyanates of the type obtained by condensing aniline with formaldehyde, followed by phosgenation ("crude MDI"); polyisocyanates containing carbodiimide groups, urethane groups, allophanate groups, isocyanurate groups, urea groups or biuret groups ("modified polyisocyanates"), and particularly modified polyisocyanates of the type derived from 2,4- and/or 2,6-tolylene diisocyanates or from 4,4'- and/or 2,4'-diphenylmethane diisocyanates.

Suitable phosphorus-containing materials are also known in the art. The phosphorus-containing condensation products have at least one, preferably at least two hydroxyl groups and are obtained, for example, by condensing (i) primary or secondary aliphatic, cycloaliphatic, aromatic, araliphatic or heterocyclic monoamines and/or polyamines, which mono- or polyamines may optionally contain OH groups; (ii) carbonyl compounds, and (iii) dialkyl phosphites. The condensation reaction may optionally be followed by alkoxylation.

Such condensation products are known and are described in, for example, German Pat. No. 1,143,022, U.S. Pat. No. 3,076,010 and in German Auslegeschriften Nos. 1,803,747 and 1,928,265. According to the present invention, preferred phosphorus-containing condensation products having at least two hydroxyl groups are those corresponding to the following general formula:

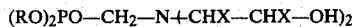

wherein

R represents $C_1$–$C_8$ alkyl or $C_1$–$C_8$ hydroxy alkyl and preferably ethyl or hydroxy ethyl; and X represents H or methyl, preferably H.

Suitable aromatic hydroxy carboxylic acids or salts thereof include, for example, hydroxy naphthalene carboxylic acids, salicyclic acid, m-hydroxy benzoic acid and/or p-hydroxy benzoic acid. Nucleus-substituted (e.g., alkylated) hydroxy benzene carboxylic acids or acetylation products or anhydrides of hydroxy carboxylic acids are also suitable. According to the present invention, hydroxy benzoic acids and/or salts thereof are preferred.

Since these acids may readily be dissolved in the phosphorus-containing component, there is generally no need for the hydroxy carboxylic acids, which exist as powders at room temperature, to be introduced as powders into the formulation.

Suitable salts of aromatic hydroxy carboxylic acids include, for example, the alkali metal and alkaline earth metal salts and particularly the amine salts. In addition to $NH_3$, the amines to be used for salt formation are those having a low vapor pressure. Suitable examples include alkoxylation products of ammonia with propylene oxide, and particularly ethylene oxide. Specific alkoxylated products include ethanolamine, diethanolamine and triethanolamine. Other suitable salt-formers include the alkoxylation products of other amines, for example N-methyl diethanolamine, N-ethyl diethanolamine or N-phenyl diethanolamine. Also useful as salt-formers are the alkali metal or alkaline earth metal hydroxides.

The degree of neutralization of the aromatic hydroxy carboxylic acids where the salt-formers just mentioned are used is generally below 100%, and preferably from 0 to 75%.

As noted above, water and/or additional organic compounds containing isocyanate-reactive hydrogen atoms may be used. Useful organic compounds include those containing at least two isocyanate-reactive hydrogen atoms and having a molecular weight of from 400 to 10,000. In addition to compounds containing amino groups, thiol groups or carboxyl groups, particularly preferred are those containing hydroxyl groups, and more particularly compounds containing from 2 to 8 hydroxyl groups. Most preferred are hydroxyl group-containing compounds having molecular weights of from 1,000 to 6,000, preferably from 1,000 to 3,000. Suitable compounds include, for example, polyesters, polyethers, polythioethers, polyacetals, polycarbonates and polyester amides containing at least 2, generally from 2 to 8, but preferably from 2 to 4 hydroxyl groups, of the type known for the production of noncellular and cellular polyurethanes. According to the present invention, it is preferred to use polyesters.

The polyesters containing hydroxyl groups suitable for use in accordance with the present invention are, for example, reaction products of polyhydric, preferably dihydric, and optionally trihydric, alcohols with polybasic, and preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic. They may be substituted, for example, by halogen atoms and/or they may be unsaturated. Examples of suitable carboxylic acids and derivatives thereof include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorphthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terephthalic acid bis-glycol ester. Examples of suitable polyhydric alcohols include ethylene glycol; 1,2- and 1,3-propylene glycols; 1,4- and 2,3-butylene glycols; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; 1,2,4-butane triol; trimethylol ethane; pentaerythritol; quinitol; mannitol; sorbitol; formitol; methyl glycoside; also diethylene glycol; triethylene glycol; tetraethylene glycol and higher polyethylene glycols; dipropylene glycol and higher polypropylene glycols; dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used.

The polyethers containing at least 2, generally 2 to 8, preferably 2 or 3, hydroxyl groups suitable for use in accordance with the present invention are also known and are obtained, for example, by polymerizing epoxides such as ethylene oxide, propylene oxide, butylene oxide, tetrahydrofuran, styrene oxide or epichlorohydrin, on their own, for example in the presence of Lewis catalysts such as $BF_3$, or by the addition of these epoxides, preferably ethylene oxide and propylene oxide, optionally in admixture or successively, with starter components containing reactive hydrogen atoms. Suitable starter components include water, alcohols, ammonia or amines. Sucrose polyethers of the type described, for example, in German Auslegeschriften Nos. 1,176,358 and 1,064,938 and formitol- or formose-started polyethers (see, e.g., German Offenlegungsschriften Nos. 2,639,083 and 2,737,951) may also be used in accordance with the present invention.

Representatives of the above-mentioned compounds are known and are described, for example, in High Polymers, Volume XVI, "Polyurethanes: Chemistry and Technology", by Saunders-Frisch, Interscience Publishers, New York/London, Volume I, 1962, pages 32 to 42 and pages 44 to 54 and Volume II, 1964, pages 5–6 and 198–199; and in Kunststoff-Handbuch, Volume VII, Vieweg-Hochtlen, Carl-Hanser-Verlag, Munich, 1966, for example on pages 45 to 71. It is, of course, possible to use mixtures of the above-mentioned compounds containing at least two isocyanate-reactive hydrogen atoms and having a molecular weight of from 400 to 10,000, for example, mixtures of polyethers and polyesters.

Also useful are compounds containing at least two isocyanate-reactive hydrogen atoms and having molecular weights of from 32 to 400. In this case, too, the compounds in question include compounds containing hydroxyl groups and/or amino groups and/or thiol groups and/or carboxyl groups. Preferred are compounds containing hydroxyl groups and/or amino groups which serve as chain-extenders or cross-linkers. These compounds generally contain from 2 to 8, and preferably from 2 to 4, isocyanate-reactive hydrogen atoms. In this case, too, it is possible to use mixtures of different compounds containing at least two isocyanate-reactive hydrogen atoms and having a molecular weight of from 32 to 400.

Examples of such lower molecular weight compounds include ethylene glycol; 1,2- and 1,3-propylene glycols; 1,4- and 2,3-butylene glycols; 1,5-pentane diol; 1,6-hexane diol; 1,8-octane diol, neopentyl glycol; 1,4-bis-hydroxymethyl cyclohexane; 2-methyl-1,3-propane diol; glycerol; trimethylol propane; 1,2,6-hexane triol; sorbitol; castor oil; diethylene glycol; triethylene glycol; tetraethylene glycol; higher polyethylene glycols having molecular weights of up to 400; dipropylene glycol; higher polypropylene glycols having molecular weights of up to 400; dibutylene glycol; higher polybutylene glycols having molecular weights of up to 400; 4,4'-dihydroxy diphenylpropane; dihydroxy methyl hydroquinone; ethanolamine; diethanolamine; N-methyl diethanolamine; triethanolamine; 3-aminopropanol and the like.

Other low molecular weight polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hyrate in the presence of metal compounds as catalysts and compounds capable of enediol formation as co-catalysts (see, e.g., German Offenlegungsschriften Nos. 2,639,084; 2,714,084; 2,714,104; 2,721,186; 2,738,154 and 2,738,512). In order to obtain plastics having improved flame resistance, these formoses are advantageously used in combination with aminoplast formers and/or phosphites (see, e.g., German Offenlegungsschriften Nos. 2,738,513 and 2,738,532). Solutions of polyisocyanate polyaddition products, and particularly solutions of polyurethane ureas containing ionic groups and/or solutions of polyhydrazocarbonamides, in low molecular weight polyhydric alcohols may also be used in accordance with the present invention (see, e.g., German Offenlegungsschrift No. 2,638,759).

Aliphatic diamines suitable for use in accordance with the present invention include, for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane ("isophorone diamine"), 2,4- and 2,6-hexahydrotolylene diamines and mixtures thereof; perhydro-2,4'- and -4,4'-diaminodiphenylmethanes; p-xylylene diamine; bis-(3-aminopropyl)methyl amine; diamino-perhydro-anthracenes (German Offenlegungsschrift No. 2,638,731); and cycloaliphatic triamines according to German Offenlegungsschrift No. 2,614,244. Hydrazine and substituted hydrazines, for example methyl hydrazine, N,N'-dimethyl hydrazine and homologues thereof, as well as acid hydrazides may also be used in accordance with the present invention. Examples of aromatic diamines include bis-anthranilic acid esters as described in German Offenlegungsschriften Nos. 2,040,644 and 2,160,590; 3,5- and 2,4-diaminobenzoic acid esters as described in German Offenlegungsschrift No. 2,025,900; the diamines containing ester groups described in German Offenlegungsschriften Nos. 1,803,635 (U.S. Pat. Nos. 3,681,290 and 3,736,350); 2,040,650 and 2,160,589; the diamines containing ether groups as described in German Offenlegungsschriften Nos. 1,770,525 and 1,809,172 (U.S. Pat. Nos. 3,654,364 and 3,736,295); 2-halogen-1,3-phenylene diamines optionally substituted in the 5-position (see, e.g., German Offenlegungsschriften Nos. 2,001,772; 2,025,896 and 2,065,869); 3,3'-dichloro-4,4'-diaminodiphenylmethane; tolylene diamine; 4,4'-diaminodiphenylmethane; and the like.

One type of polyol which is particularly suitable for use in accordance with the present invention are the esters of from 1.5 to 2 mols of ethylene glycol and 1 mol of benzene dicarboxylic acid, for example phthalic acid, with the esters having average molecular weights of from about 250 to 600.

It has been found that the conventional stoichiometric ratios used in classical polyurethane chemistry are not essential to obtain the advantageous properties of the new intumescent compositions and particularly the intumescent foams. Thus, components 2, 3 and, optionally, 4 are combined irrespective of the stoichiometry normally required in isocyanate chemistry and the resultant mixture is reacted in simple preliminary tests with different quantities of the polyisocyanate in order empirically to determine the optimal amount required.

The thus-determined approximate quantities for the individual components 2, 3 and, optionally, 4 in the reaction mixture to be reacted with the polyisocyanate add up to 100% and amount to from 25 to 80%, by weight, preferably from 40 to 75%, by weight, of the phosphorus-containing condensation products having at least two hydroxyl groups;

to from 10 to 65%, by weight, preferably from 15 to 40%, by weight, of the aromatic hydroxy carboxylic acid or salts thereof;

to from 0 to 8.5%, by weight, preferably from 0 to 5.5%, by weight, of water; and to from 0 to 50%, by weight, preferably from 0 to 35%, by weight, of the additional organic compounds containing isocyanate-reactive hydrogen atoms.

In general, 100 parts, by weight, of this reaction mixture are reacted with from 50 to 180 parts, by weight, and preferably from 65 to 150 parts, by weight, of the polyisocyanate.

Production of the intumescent compositions may be carried out in a solvent, although it is preferably carried out in the absence of solvents. The preferred products are foams which may have densities of from about 15 to 800 kg/m$^3$, preferably from 60 to 300 kg/m$^3$. A particularly well-balanced combination between low density, which is required for insulation capacity, and mass per unit volume, which is required for the foaming effect on contact with a flame, is represented by foams of the present invention having densities of from about 80 to 200 kg/m$^3$.

The various reaction components may be individually combined. However, it is preferred to prepare a preliminary mixture from the reactive components 2, 3 and, optionally, 4. The resultant liquid reaction component is generally present in the form of a liquid mixture or solution in which all the necessary constituents except for the polyisocyanate are contained. If necessary, the components may be briefly heated to assist in forming the liquid mixture. In this way, the intumescent compositions according to the present invention may be formulated as, or produced from, a two-component mixture. The machines normally encountered in polyurethane technology may be used for this purpose.

Further components, such as melamine, melamine condensates, urea-formaldehyde condensates, melamine phosphates, amine polyphosphates, phosphoric acid esters, for example tricresyl phosphate or dibutyl cresyl phosphate, aluminum oxide hydrates, glass powders, solid or hollow glass beads or other silicate beads and other additives which modify burning properties, may readily be added to the preliminary mixture of components and, optionally, even to the isocyanate.

EXAMPLES

The present invention is illustrated by the following Examples. The parts quoted represent parts by weight unless otherwise indicated.

The following components were used:

Component A: the phosphorus-containing condensation product:

Component B: water or an organic compound containing active hydrogen atoms:
- B1 = tap water
- B2 = isopropanol
- B3 = -oligoester of phthalic acid and ethylene glycol, OH number approximately 280, acid number approximately 0.6

Component C: aromatic hydroxy carboxylic acids or salts thereof:
- C1 = 4-hydroxy benzoic acid
- C2 = 3-hydroxy benozic acid
- C3 = 2-hydroxy benzoic acid
- C4 = reaction product of 25 parts of salicylic acid and 20 parts of triethanolamine.

The following tests were carried out and the following assessments made:

Foaming of a material sample:

| Increase in volume up to 100% | moderate |
|---|---|
| 100–300% | good |
| above 300% | very good |

Classification of after-burning after the exposure of a 2 g sample of material to a Bunsen flame:

| Goes out immediately | none |
|---|---|
| Goes out after less than 3 seconds | brief |
| Goes out after less than 5 seconds | hardly any |

The following intumescence tests were carried out:

Test I: the material sample (2 g) was introduced into a heating cabinet preheated to 260° C. and was then assessed for foaming after storage for one hour at 260° C.

Test II: the material sample (2 g) was introduced at room temperature into a heating cabinet which was then heated to 260° C. over a period of one hour, after which the material was left standing therein for another hour. The foaming which had taken place was then assessed. The same sample was then exposed to a non-luminous Bunsen flame and observed for further foaming ("after-foaming"):

| After-foaming | = | + |
|---|---|---|
| No after-foaming | = | 0 |
| Shrinkage | = | − |

Test III: a 2 g material sample was exposed to a non-luminous Bunsen flame. It was then observed for both foaming and after-foaming following removal of the flame at various stages of the exposure process.

Water Storage Test: a material sample (8×4×2 cm) was stored for three days under tap water, after which the water was poured away and replaced by fresh water. After another three days, the water was poured away, the test specimen was centrifuged and dried at 75° C. Before and after drying, the test specimen was examined to determine whether a distinct change in volume (edge length) or a significant change in strength could be measured by a centimeter rule or by manual testing. The dried samples were then subjected to Tests I, II and III.

The following Examples are intended to demonstrate the intumescent effect of the additions of aromatic hydroxy carboxylic acids according to the present invention.

COMPARISON EXAMPLE 1

98 parts of component A and 2 parts of water are thoroughly stirred with 75 parts of a conventional commercial polyisocyanate based on aniline/formaldehyde condensates (Desmodur ® 44 V 10 of Bayer AG, Germany; NCO content 30=32%). A foam having a density of about 150 kg/m$^3$ is formed.

| Test II: | foaming | none |
|---|---|---|
|  | after-foaming | 0 |

Since neither distinct foaming nor after-foaming is observed in Test II, which is crucial to the safety of intumescent compositions, such a formulation would not be useful as an intumescent composition.

EXAMPLE 1

2 parts of water and 40 parts of hydroxy benzoic acid are dissolved in 98 parts of component A. 100 parts of this solution are thoroughly stirred with 75 parts of the isocyanate used in Comparison Example 1. The intumescent foams formed are again subjected to Test II:

| Hydroxy benzoic acid | Density (kg/m$^3$) | Foaming | After foaming |
|---|---|---|---|
| para | 165 | very good | + |
| ortho | 120 | good | + |
| meta | 140 | good | + |

The results show that all three hydroxy benzoic acids provide the foams with useful intumescent behavior. The foams according to Example 1 are, of course, flame-resistant in the same way as the sample from Comparison Example 1. In other words, they receive the classification "after-burning, brief" in the after-burning test, i.e., they go out three seconds after removal of the flame.

EXAMPLE 2

Particular importance is attributed to the behavior of a foam which has been subjected to prolonged heating in accordance with Test II in terms of the extent to which it after-foams on ultimate exposure to a flame. An effective intumescent foam should still be capable of foaming at least if it has not already foamed.

If 2 parts of water, 25 parts of salicyclic acid and 20 parts of triethanolamine (salt-former) are dissolved in 98 parts of component A and the resulting solution foamed by mixing with 216 parts of the isocyanate described in Comparison Example 1, the foam obtained shows outstanding activity in terms of after-foaming in Test II. If the salicyclic acid is omitted from otherwise the same formulation, no more after-forming takes place. In both cases, the densities of the foams were of the order of 150 kg/m$^3$.

EXAMPLE 3

A solution of 94 parts of component A, 6 parts of component B1, 40 parts of component C1 and 20 parts of component B3 is continuously mixed with 120 parts of the isocyanate used in Example 2 in a machine provided with a stirrer-equipped mixing head. The reaction mixture foams after 40 seconds.

The same test is then repeated with only 60 parts of component B3 and 160 parts of isocyanate.

For comparison, the two tests are repeated without the hydroxy benozic acid:

|   |   | Density (kg/m$^3$) | Test III after burning | Test II foaming | After-foaming |
|---|---|---|---|---|---|
| (a) | 40 C1/20 B3 | 130 | none | good | + |
| (b) | 00 C1/20 B3 | 138 | hardly any | shrinkage | − |
| (c) | 40 C1/60 B3 | 125 | none | good | + |
| (d) | 00 C1/60 B3 | 125 | brief | shrinkage | − |

It may be seen that, where polyester hydroxyl compounds are used in the formulation, the foam produced using the hydroxy carboxylic acids are distinctly superior to the foams produced without the addition of such acids. Another factor worth noting is that the after-burning behavior is not adversely affected, but rather is improved by the addition of component C.

If the foams according to Examples 3(a) and 3(c) are produced on a belt-type foaming machine, foam boards are obtained. These boards may be used as intumescent insulation boards or may be thermoplastically formed. To this end, 2 cm thick boards of the intumescent foam are heated to about 150° C. in a heating cabinet (high frequency, microwave or infrared heating may also be used) and are then bent, for example on a template to form tubes or half-shells which retain the shape after cooling. It is also possible to compress the boards in a press heated to about 130° C.

If component C1 is replaced by component C2 or C3, the densities of the foams obtained change while the intumescent properties thereof do not.

EXAMPLE 4

100 parts of component A, 20 parts of p-hydroxy benzoic acid, 20 parts of o-hydroxy benzoic acid and 2.5 parts of water are combined and dissolved at about 60° C. 30 parts of the polyisocyanate used in Comparison Example 1 are then stirred into 40 parts of this solution at room temperature, a rigid foam having a density of 140 kg/m$^3$ being obtained:

| Increase in volume on exposure to a flame | very good |
|---|---|
| After-burning | brief |
| Test I | good |
| Test II foaming | good |
| Test III after-foaming | + |

The same classifications are assigned after the water storage test.

EXAMPLE 5

The procedure is as in Example 4, except that 10 parts of a polyester of adipic acid and ethylene glycol (OH-number 192, molecular weight about 2,0000) and 40 parts of component C1 are added to the preliminary mixture. The rigid foam formed has a density of 145 kg/m$^3$.

| Test I | good |
|---|---|
| Test II foaming | good |
| Test II after-foaming | + |
| Test III foaming | very good |
| Test III after-burning | hardly any |

The same classifications are assigned after storage in water.

EXAMPLE 6

100 parts of component A and 40 parts of 4-hydroxy benzoic acid are converted by heating up to 95° C. into a solution to which 20 parts of dibutyl cresyl phosphate are added. The resulting solution is then stirred with 100 parts of the polyisocyanate used in Comparison Example 1. The thoroughly stirred solution is then sprayed onto a steel plate on which it hardens and forms a film full of bubbles. If part of the film is removed, the following classifications are assigned before and after the water storage test (Test III):

| Foaming | very good |
|---|---|
| After-burning | brief |

The same classifications are awarded when the phosphate plasticizer is left out, the only difference in this case being that the coating film is somewhat more brittle. When the steel plate is exposed to a flame, the intumescence reaction takes place. In other words, an insulating foam is formed.

EXAMPLE 7

100 parts of component A, 20 parts of salicylic acid, 30 parts of 4-hydroxy benzoic acid and 25 parts of isopropanol (B2) are mixed together to form a solution. 40 parts of this solution are reacted with 30 parts of the isocyanate described in Comparison Example 1. A highly viscous material is formed which, although insoluble in water, is soluble in isopropanol.

A 60% solution of the reaction product in isopropanol is prepared. A steel plate is coated with this solution and the coating formed is dried for 30 minutes at 150° C. to form a rigid insoluble film. When the steel plate is exposed to a flame, an insulating, fire-resistant foam is formed through the intumescence reaction.

The same result is obtained when a wooden beam is coated with the solution. After drying, an insulating foam is formed on exposure to a flame and prevents the flame from spreading.

Using a conventional emulsifying machine, the isopropanol solution may even be converted with water into an emulsion from which the isopropanol may, if desired, be removed by thin layer distillation. Emulsions of this type are eminently suitable for coating purposes.

EXAMPLE 8

100 parts of component A, 20 parts of component C1, 20 parts of component C2 and 50 parts of component B3 are mixed and dissolved by heating up to 95° C. 40 parts of the resulting solution are thoroughly stirred at room temperature with 30 parts of the isocyanate described in Comparison Example 1, followed immediately by application to a sand-blasted steel substrate on which the material hardens in a few minutes to form a rigid film. When the steel substrate is exposed to a flame, the film forms a voluminous, insulating foam. If part of the film is removed from the substrate, the following comparable classifications are obtained in the described tests both before and after storage in water:

| Test I | good |
|---|---|
| Test II foaming | good |
| Test II after-foaming | + |
| Test III foaming | very good |
| Test III after-burning | brief |

If the same test is repeated with the preliminary mixture additionally containing 3 parts of water, a foam assigned the same classifications is formed on the steel substrate.

EXAMPLE 9

An opening measuring 15×30×15 cm is left in a 15 cm thick fire wall. Several electrical cables differing in diameter and type of insulation are passed through this opening on a 20 cm wide cable route. The opening is then temporarily closed at one end by means of a cardboard cover. A freshly prepared two-component mixture (approximately 1,000 g) is then poured in from the open end:

| Component 1 | Component 2 |
|---|---|
| 100 parts of component A | polyisocyanate from |
| 40 parts of component C1 | Comparison Test I |
| 20 parts of component B3 | (25 parts) |
| in the form of a solution. | |

The reaction mixture foams in the cavity and fills all the gaps between cables, cable route and masonry. Foam emerging from the opening is cut off after it has hardened. Under test, the foam is awarded the same classification before and after storage in water:

| Test I | good |
|---|---|
| Test II foaming | good |
| Test II after-foaming | + |
| Test III foaming | very good |
| Test III after-burning | none |
| Density approximately 149 kg/m$^3$ | |

On exposure to the flame of an oil burner in a small firing oven for testing for breaks in the masonry, no fumes or flames pass through the masonry opening filled with the foam, even after a test period of 30 minutes. Those parts of the foam filling which have been affected by the flame may readily be removed from the opening so that a new foam filling may be readily introduced.

EXAMPLE 10

A mixture of 100 parts of component A, 3.5 parts of component B1, 25 parts of component C3 and 20 parts of triethanolamine is dissolved by heating up to 95° C. and, using a polyurethane two-component spray gun, is mixed at room temperature in a ratio of 40 parts of mixture to 60 parts of isocyanate according to Comparison Example 1 and sprayed onto steel pipes, aluminum plates and wooden boards. In every case, a firmly adhering foam film is formed on the substrate. On exposure to a nonluminous natural gas flame (temperature from 800° to 1,100° C.), a vigorously expanding intumescent foam is immediately formed from the layer of foam, preventing the flame from spreading to the parts situated behind the layer of foam.

Samples of foam taken from the unaffected foam coating are found in the described test to have the following properties before and after storage in water for a density of the order of 190 kg/m$^3$:

| Test I | good |
|---|---|
| Test II foaming | good |
| Test II after-foaming | good |
| Test III foaming | very good |
| Test III after-burning | brief |

EXAMPLE 11

50% (based on solids) of melamine powder are added to the 60% isopropanol solution obtained in accordance with Example 7 and the thus-obtained viscous mixture is applied to a slab of asbestos cement. After drying (30 days in a laboratory), Test III is carried out on the dry coating:

| Foaming | good |
|---|---|
| After-burning | none |

What is claimed is:
1. Intumescent compositions, which may be foamed, obtained by reacting:
 (1) polyisocyanates,
 (2) phosphorus-containing condensation products having at least one hydroxyl group and obtained by condensing (i) primary or secondary aliphatic, cycloaliphatic, aromatic, araliphatic or heterocyclic monoamines and/or polyamines, which mono- and polyamines may contain OH groups, (ii) carbonyl compounds, and (iii) dialkyl phosphites,
 (3) aromatic hydroxy carboxylic acids or salts thereof, and
 (4) optionally, water and/or additional organic compounds containing isocyanate-reactive hydrogen atoms.

2. The compositions of claim 1 wherein, following condensation, said component (2) is alkoxylated.

3. The compositions of claim 1 obtained by reacting from 50 to 180 parts by weight of polyisocyanate with 100 parts by weight of a mixture comprising from 20 to 80% by weight of phosphorus-containing condensation products, from 10 to 65% by weight of hydroxy carboxylic acids or salts thereof, from 0 to 8.5% by weight of water, and from 0 to 50% by weight of additional organic compounds containing isocyanate-reactive hydrogen atoms.

4. The compositions of claim 1 or 3 characterized in that said polyisocyanates are of the type obtained by condensing aniline with formaldehyde, followed by phosgenation.

5. The compositions of claim 1 or 3 characterized in that the phosphorus-containing condensation products correspond to the following formula:

$$(RO)_2PO-CH_2-N+CHX-CH-OH)_2$$

wherein
R represents $C_1$-$C_8$ alkyl or $C_1$-$C_8$ hydroxy alkyl, and
X represents H or methyl.

6. The compositions of claim 1 characterized in that hydroxy benzoic acids are used as the aromatic hydroxy carboxylic acid.

* * * * *